3,437,603
MANUFACTURE OF SPHEROIDAL SILICA-
ALUMINA PARTICLES
Lee Hilfman, Prospect Heights, Ill., assignor to Universal Oil Products Company, Des Plaines, Ill., a corporation of Delaware
No Drawing. Filed Oct. 17, 1966, Ser. No. 586,926
Int. Cl. B01j *11/40*
U.S. Cl. 252—453                                              9 Claims

ABSTRACT OF THE DISCLOSURE

Production of spheroidal silica-alumina particles by commingling ammonium hydroxide and aluminum sulfate in a ratio to effect a pH of from about 3.8 to about 4.5 and a partial hydrolysis of said aluminum sulfate, separately forming a solution comprising an alkali metal silicate acidified with a mineral acid selected from the group consisting of hydrochloric and sulfuric acids and containing the anion of said acid in from about 1.1 to about 1.5 mole ratio with the alkali metal content of the resulting acidified alkali metal silicate solution, admixing the aluminum sulfate partial hydrolysis product with the acidified water glass, passing the resultant mixture in the form of droplets and while still below gelation temperature into an oil bath maintained at a temperature of from about 120° F. to about 500° F. and at a pressure to maintain the water content of said droplets in a substantially liquid phase, and forming said droplets into hydrogel spheres therein, aging the hydrogel spheres in an alkaline medium and thereafter waterwashing and treating the same at calcination conditions.

---

This invention relates to a novel process for the manufacture of spheroidal silica-alumina particles. The use of silica-alumina particles in substantially spheroidal shape offers numerous advantages when employed as an absorbent, or as a catalyst, or component of a catalyst, for the conversion of organic compounds and especially for the conversion of hydrocarbons. When employed as a fixed bed in a reaction or contacting zone, the spherically shaped particles permit a more uniform packing, thereby reducing variations in the pressure drop through said fixed bed, and in turn reducing channelling which inherently results in a portion of the bed being by-passed.

Spheroidal inorganic oxide particles of substantially uniform physical characteristics are manufactured in a commercially successful process whereby an inorganic oxide hydrosol maintained at below gelation temperature is dispersed as droplets into a gelling medium maintained at gelation temperature, the resulting hydrogel spheres being immediately subjected to a series of aging treatments in a basic medium. The gelling medium employed is a water-immiscible suspending liquid—usually a light gas oil chosen principally for its high interfacial tension with respect to water. Passage of the droplets through the oil suspending medium produces two effects. First, as each droplet penetrates the surface it draws into a spherical shape. The droplets are principally water at this step and, being insoluble in the oil, they tend to draw into a shape resulting in the least surface area for their volume. The second effect is that the formed spheres are given time to gel and build an initial structure while gravitating to the bottom of the suspending oil so that sufficient structural stability is established to resist the strains emposed by the transfer and subsequent treatment in the aging process. It will be recognized that an essential requirement of the hydrosol is that it be capable of forming a hydrogel in the relatively limited time available while gravitating to the bottom of the suspending medium. Alumina sols, or mixtures comprising an alumina sol, usually require a gelling agent to effect gelation within the allotted time interval. When using a conventional gelling agent, such as ammonium hydroxide, precipitation occurs almost immediately. Thus, the desired spheroidal particles cannot be formed by the method herein contemplated and more sophisticated gelling agents, e.g. a weak base such as urea, hexamethylenetetramine, and the like, which has a hydrolysis rate increasing with temperature and forms ammonia and carbon dioxide in the process, is necessitated.

Silica-alumina spheres are suitably manufactured by the described method provided that an alumina sol is utilized as the alumina source, and further provided that a weak base is incorporated in the hydrosol as aforesaid to facilitate gelation within the allotted time interval. Utilization of an alumina sol involves a rather tedious and relatively expensive preparation wherein aluminum metal is digested in aqueous aluminum chloride solution and/or aqueous mineral acid solution—usually hydrochloric acid. While an aluminum salt would appear to be a much cheaper source of alumina it has not heretofore been utilized with any substantial degree of success in a commercial process. An aluminum salt solution, such as aqueous aluminum sulfate solution commingled with an acidic water glass solution, results in a mixture highly acidic in nature and convertible to a hydrogel only over an extended period of time not suitable to the manufacture of hydrogel spheres by the oil drop method in a practical commercial process. The incorporation of a conventional gelling agent in the hydrosol effects either premature gelation or results in too stable a mixture to accomplish gelation in the desired time interval.

It is an object of this invention to present a novel process for the manufacture of spheroidal silica-alumina particles. It is a further object to present a method of manufacturing said particles by the oil-drop method utilizing aluminum sulfate as a source of alumina. It is a still further object to obviate the requirement of sophisticated gelling agents presently employed. In one of its broad aspects, this invention embodies a process for the manufacture of spheroidal silica-alumina particles which comprises commingling ammonium hydroxide and aluminum sulfate in a ratio to effect a pH of from about 3.8 to about 4.5 and a partial hydrolysis of said aluminum sulfate, separately forming a solution comprising an alkali metal silicate acidified with a mineral acid selected from the group consisting of hydrochloric and sulfuric acids and containing the anion of said acid in from about a 1.1 to about a 1.5 mole ratio with the alkali metal content of the resulting acidified alkali metal silicate solution, admixing the aluminum sulfate partial hydrolysis product with the acidified water glass, passing the resultant mixture in the form of droplets and while still below gelation temperature into an oil bath maintained at a temperature of from about 120° F. to about 500° F. and at a pressure to maintain the water content of said droplets in a substantially liquid phase, and forming said droplets into hydrogel spheres therein, aging the hydrogel spheres in an alkaline medium and thereafter waterwashing and treating the same at calcination conditions.

Other objects and embodiments of this invention will become apparent in the following detailed specification.

Pursuant to the process fo this invention a partial hydrolysis of aluminum sulfate is effected on commingling the same with ammonium hydroxide in a mole ratio to effect a pH of from about 3.8 to about 4.5. It is preferred to effect a pH within a more limited range of from about 3.9 to about 4.2. It is contemplated that the partial hydrolysis product is substantially equivalent to the formula $Al_2SO_4(OH)_4$. As a practical matter, the partial hydrolysis is effected in aqueous solution, usually by the addition of a dilute ammonium hydroxide solution to a thoroughly stirred aqueous aluminum sulfate solution. The aluminum sulfate partial hydrolysis product herein contemplated may be described as a preneutralized aluminum sulfate wherein two of the sulfate radicals have been replaced with hydroxy radicals. However, it may very well be that the partial hydrolysis product exists as a chemical complex which nevertheless comprises a ratio of about two hydroxy groups per aluminum ion. In any case, the partial hydrolysis product of this invention is unique with respect to the other hydrolysis products of aluminum sulfate in that it exists in a clear water-white solution as opposed to a milky white precipitate or gel. Furthermore, the hydrolysis product of this invention retains its physical characteristics and does not set up into a gel in any appreciable time of a pH of about 4. The partial hydrolysis product herein described as an essential feature of this invention. A completely hydrolyzed aluminum sulfate is inoperable to accomplish the objectives of this invention as is a partially hydrolyzed aluminum sulfate wherein only one of the sulfate radicals have been replaced with a hydroxy radical. It will be appreciated that a selective hydrolysis reaction as herein contemplated requires that the reactants be thoroughly commingled and subjected to vigorous agitation to insure a substantially uniform reaction mixture and intimate contact of the reactants.

In the further manufacture of silica-alumina spheroidal particles in accordance with the process of this invention, the aluminum sulfate partial hydrolysis product is admixed with an acidified alkali metal silicate solution containing chloride (or corresponding anion derived from the acidification agent) in from about a 1.1 to about a 1.5 mole ratio with the alkali metal content thereof. The alkali metal silicate is most conveniently sodium silicate more commonly referred to as "water glass." The water glass is acidified with a mineral acid, sulfuric acid being suitable although hydrochloric acid is preferred. In any case, it is essential that the aqueous water glass solution be acidified to contain chloride, or sulfate as the case may be, in a mole ratio of from about 1.1 to about 1.5 with the sodium or alkali metal content thereof, a mole ratio of from about 1.1 to about 1.3 being preferred. Within the stated limitations, the acidified water glass solution is stable and can be commingled with the aluminum sulfate partial hydrolysis product without premature gelation. While a higher ratio is operable, this entails subsequent excessive washing of the spheroidal particles which is both time consuming and deleterious to the finished product. The acidified water glass is prepared by conventional methods, for example, an aqueous water glass solution is admixed with the mineral acid while maintaining the mixture below about 60° F. to obviate polymerization of the resulting silic acid and premature gelation.

The aluminum sulfate partial hydrolysis product is preferably commingled with an acidified water glass solution in the desired ratio substantially immediately before dispersing the mixture as droplets into an oil bath utilized as a suspending medium. The oil drop method herein referred to has been described in the art, for example, U.S. Patent No. 2,620,314 issued to James Hoekstra contains a somewhat detailed description. Such reference however does not provide a teaching of the present invention which relates to the manufacture of silica-alumina particles utilizing an aluminum sulfate partial hydrolysis product as an alumina source. Thus, the mixture, described herein as a hydrosol and comprising the aluminum sulfate partial hydrolysis product and the acidified water glass solution, is dispersed as droplets into an oil bath or suspending medium maintained at a temperature effecting gelation. Generally, a temperature of from about 120° F. to about 500° F. is suitable provided that a pressure is imposed to maintain the water portion of the droplets in a substantially liquid phase to obviate a rapid evolution of gases causing the resultant hydrogel spheres to rupture or otherwise become weakened. A temperature of from about 120° F. to about 212° F. is suitably employed at about atmospheric pressure.

The spheroidal hydrogel particles recovered from the oil suspending medium are aged in an alkaline medium. The alkaline medium may consist of the oil suspending medium itself and containing gaseous ammonia dispersed therein. However, although aqueous ammonia has been previously avoided as an aging medium in view of its tendency to leach alumina from the spheroids, it has been found surprisingly advantageous when used in a concentration of from about 5% to about 30%, a concentration in an intermediate range, say from about 10% to about 15% being preferred. Aqueous ammonia in the stated concentration range not only appreciably reduces breakage of the spheroids but does not leach alumina therefrom. Suitable aging is accomplished in from about 0.5 to about 4 hours time.

In washing the aged spheroidal particles preliminary to drying and calcining of the same, it is an objective to separate sodium, or corresponding alkali metal, without using excessive volumes of wash water. It has been found particularly effective to include an ammonium salt of a strong acid, suitably ammonium nitrate, in the wash solution, a concentration as low as about 1% being effective. In many cases it is desirable to manufacture spheroidal particles of relatively low average bulk density (ABD), e.g., in the order of about 0.5 gms./cc. In this latter case it has been found desirable to conduct the water washing process in two phases. Thus, the aged spheroidal particles are initially washed with the ammonium salt solution and thereafter with an aqueous ammonia solution, an ammonia concentration of from about 1% to about 5% being suitably effective. It has been further observed that the temperature of the water wash influences the ABD of the spheroidal particles, higher temperatures up to about 95° C. tending toward a lower ABD. In any case, the spheres are thereafter dried at a temperature of from about 200° F. to about 600° F. for 6 to about 24 hours or more, and then calcined at a temperature of from about 800° F. to about 1400° F. for from about 2 to about 12 hours or more.

The supheroidal silica-alumina particles prepared in accordance with the method of this invention may be composited with any of the several catalytically active metallic materials in the oxidized or reduced state. Of particular interest are those catalysts comprising one or more metals of group VI–B and VIII including molybdenum, tungsten, chromium, iron, nickel, cobalt, platinum, palladium, ruthenium, rodium, osmium and iridium. Thus, silica-alumina spheres prepared in accordance with the method of this invention can be utilized advantageously as a catalyst or component thereof to effect a variety of hydrocarbon conversion reactions involving reaction conditions comprising a temperature in the 70–1400° F. range. The silica-alumina spheres of this invention are particularly useful in combination with hydrogenation component such as nickel together with molybdenum, tungsten, etc. in effecting the hydrocracking of heavy oils, including vacuum residuals, in the presence of hydrogen to form petroleum products in the middle distillate range utilizing a temperature of from about 500° F. to about 1000° F. and pressures of from about 500 p.s.i.g. to about 2500 p.s.i.g. Said hydrocarbon conversion reactions further include polymerization of olefins, particularly ethylene, propylene, 1-butene, 2-butene, isobutylene, and also higher boiling olefins, at polymerization reaction conditions. The silica-alumina product is also useful as a catalyst or a component thereof in effecting the alkylation of isoparaffins with olefins or other alkylating agents including, for example, alkyl halides and the like; and also the alkylation of isobutane, isopentane and/or isohexane with ethylene, propylene, 1-butene, etc., or mixtures thereof; and also the alkylation of aromatics with olefins or other alkylating agents, particularly the alkylation of benzene, toluene, etc., with propylene, butylene, amylene, and higher boiling olefins including nonenes, decenes, undecenes, etc., the foregoing alkylation reactions being effected at alkylation conditions disclosed in the art. The products of this invention are further helpful in the isomerization of paraffins, particularly n-butane, n-pentane, n-hexane, n-heptane, n-octane, etc., or mixtures including, isomerization of less highly branched chain saturated hydrocarbons such as the isomerization of 2- or 3-methylpentane to 2, 3- and 2, 2-dimethylbutane; isomerization of dimethylcyclohexane, to methylcyclohexane, isomerization of methylcyclopentane to cyclohexane, etc., at isomerization reaction conditions. Other hydrocarbon conversion reactions including hydrocarbon transfer reactions, alkyl transfer reactions, transalkylation reactions, and the reforming of gasoline or naphtha to improve the anti-knock characteristics thereof are effectively catalyzed utilizing a silica-alumina spheroid as a catalyst or component thereof.

The following example is presented in illustration of one preferred embodiment of this invention and is not intended as a limitation of the generally broad scope of this invention as set out in the appended claims.

Example I

Spheroidal silica-alumina particles were prepared containing 75 weight percent silica and 25 weight percent alumina. Two individual formulations were initially prepared. The first formulation was prepared by the rapid addition of 520 cubic centimeters of a 28% aqueous ammonia solution to 1710 cubic centimeters of a vigorously stirred aluminum sulfate solution containing the equivalent of 150 grams of alumina. The second formulation was prepared by adding 2046 cubic centimeters of a chilled (40–50° F.) water glass solution, containing 240 cubic centimeters of water and the equivalent of 450 grams of silica, to 780 cubic centimeters of a vigorously stirred 20% HCl solution, the latter being immersed in an ice bath. Care was taken to maintain the temperature of the acidified water glass below 60° F. to obviate polymerization and premature gelation. The acidified water glass contained chloride in a 1.1 mole ratio with sodium. The formulations thus prepared were charged to a mixing vessel in separate streams, the first at the rate of 40 cc./min. and the second at the rate of 60 cc./min. to effect the desired silica-alumina ratio. The resulting mixture was substantially immediately released as droplets to the surface of a hot oil bath (203° F.) maintained in a vertical column 6¼" in diameter and 11½ ft. in length. The hydrogel spheres which formed on gravitating through the oil bath were recovered from the bottom of the column, cooled and aged for one hour in a 10% aqueous ammonia solution at room temperature. The spheres were thereafter water-washed over a four hour period at 203° F. utilizing about 20 gallons of water containing 1.0 weight percent ammonium nitrate. The spheres were finished by drying at 212° F. for 3 hours and calcining at 1250° F. for another 3 hours. The average bulk density (ABD) of the finished spheres was .54 gram per cubic centimeter. The spheres contained 0.015% sodium, 0.06% sulfate and 23.4% $Al_2O_3$ the remainder being silica. The fines comprised only 0.9% of the finished product.

I claim as my invention:

1. A process for the manufacture of spheroidal silica-alumina particles which comprises commingling ammonium hydroxide and aluminum sulfate in aqueous solution in a ratio to effect a pH of from about 3.8 to about 4.5 and a partial hydrolysis of said aluminum sulfate, separately forming a solution comprising an alkali metal silicate acidified with a mineral acid selected from the group consisting of hydrochloric and sulfuric acids and containing the anion of said acid in from about 1.1 to about a 1.5 mole ratio with the alkali metal content of the resulting acidified alkalimetal silicate solution, admixing the aluminum sulfate partial hydrolysis product and the acidified alkali metal silicate solution, passing the resultant mixture as droplets and while still below gelation temperature into a water immiscible suspending medium maintained at gelation temperature and forming said droplets into a hydrogel, aging the hydrogel spheroids in an alkaline medium and thereafter water-washing, drying and treating the same at calcination conditions.

2. The process of claim 1 further characterized in that said ammonium hydroxide and said aluminum sulfate are commingled in a ratio to effect a pH of from about 3.9 to about 4.2.

3. The process of claim 2 further characterized in that said anion is chloride and said alkali metal silicate is sodium silicate.

4. The process of claim 3 further characterized in that said chloride is contained in the acidified sodium silicate solution in a mole ratio of from about 1.1 to about 1.3 with the sodium content thereof.

5. The process of claim 3 further characterized in that said alkaline medium is ammonia in aqueous solution in from about a 5% to about a 30% concentration.

6. The process of claim 5 further characterized in that said alkaline medium is ammonia in from about a 10% to about a 15% concentration.

7. The process of claim 6 further characterized in that said water-washing is effected with an aqueous solution containing an ammonium salt of a strong acid and at least about a 1% concentration therein.

8. The process of claim 7 further characterized in that said water-washing further comprises a second phase wherein the spheroidal hydrogel particles are further washed with an aqueous solution containing ammonia in from about a 1% to about a 5% concentration.

9. The process of claim 6 further characterized in that said ammonium salt is ammonium nitrate.

References Cited

UNITED STATES PATENTS

| 2,897,159 | 7/1959 | Hoekstra et al. | 252—448 |
| 3,131,156 | 8/1964 | Wilson et al. | 252—455 |
| 3,210,293 | 10/1965 | O'Hara | 252—453 |

DANIEL E. WYMAN, Primary Examiner.

C. F. DEES, Assistant Examiner.

U.S. Cl. X.R.

252—455